(12) United States Patent
Mourier

(10) Patent No.: US 6,335,918 B1
(45) Date of Patent: Jan. 1, 2002

(54) DEVICE FOR ESTIMATING DATA CELL LOSS RATE IN A DIGITAL COMMUNICATION NETWORK SWITCHING UNIT

(75) Inventor: Marc Mourier, Levallois Perret (FR)

(73) Assignee: Thomson-CSF, Paris (FR)

(*) Notice: Subject to any disclaimer, the term of this patent is extended or adjusted under 35 U.S.C. 154(b) by 0 days.

(21) Appl. No.: 09/147,101
(22) PCT Filed: Apr. 1, 1997
(86) PCT No.: PCT/FR97/00576
  § 371 Date: Oct. 5, 1998
  § 102(e) Date: Oct. 5, 1998
(87) PCT Pub. No.: WO97/38504
  PCT Pub. Date: Oct. 16, 1997

(30) Foreign Application Priority Data

Apr. 5, 1996 (FR) .............................. 96 04315

(51) Int. Cl.⁷ .................. G01R 31/08; H04J 1/16; H04J 3/14; H04L 1/00; H04L 12/26
(52) U.S. Cl. .................. 370/241; 370/229; 370/250
(58) Field of Search ................. 370/229–235, 370/395, 389, 357, 412–418, 241, 250

(56) References Cited

U.S. PATENT DOCUMENTS

| 5,140,584 A | * | 8/1992 | Suzuki | 370/235 |
| 5,737,314 A | * | 4/1998 | Hatono et al. | 370/235 |
| 6,097,698 A | * | 8/2000 | Yang et al. | 370/231 |

* cited by examiner

*Primary Examiner*—Huy D. Vu
*Assistant Examiner*—Kevin C. Harper
(74) *Attorney, Agent, or Firm*—Oblon, Spivak, McClelland, Maier & Neustadt, P.C.

(57) ABSTRACT

The device comprises a traffic summator (4) for summing the number of cells which are present on each incoming highway of the switch during each cell instant and are destined for one and the same outgoing highway (p). A highway emulation group (p) is allocated to each outgoing highway. It is composed of a specified number of counters ($B_i$) simultaneously loaded with the total number of cells which are destined for the outgoing highway and are presented on the incoming highways of the switch. The respective counts of each counter ($B_i$) are limited by thresholds ($S_i$) so as to estimate, when the number of cells totalled up in a counter ($B_i$) exceeds a threshold ($S_i$), the number of cells which may be lost on the corresponding outgoing highway (p).

4 Claims, 1 Drawing Sheet

Figure 1:
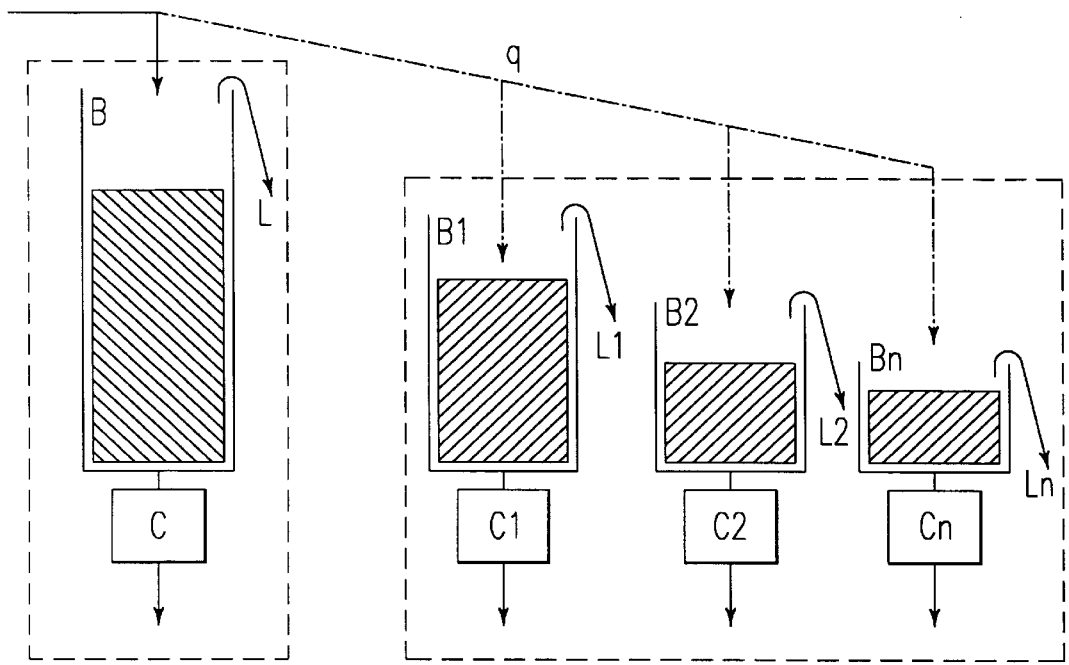

DEVICE FOR ESTIMATING DATA CELL LOSS RATE IN A DIGITAL COMMUNICATION NETWORK SWITCHING UNIT

The present invention relates to a device for estimating the loss ratio of data cells in a digital transmission network switch. It applies in particular to the construction of local area networks operating in the transfer mode known by the abbreviation ATM for "Asynchronous Transfer Mode such as described in European Patent Application No. 0 0650 276 A1".

In a network operating in ATM mode, the digital information is exchanged between nodes of the network in the form of fixed-format packets of bits called "cells". Each cell is composed, on the one hand, of a header serving to identify the cell and the communication to which it belongs and, on the other hand, of an information field containing the useful data to be conveyed. The nodes of the network are responsible for routing the ATM cells applied to their inputs to one or more outputs. These nodes consist of switches, structured for example around a data transfer bus coupled to incoming highways and outgoing highways by way of shift registers organized as a stack, so as to store the temporarily surplus cells when several cells applied to different incoming highways are intended to be broadcast on the same output. However, the limited size of the shift register stacks incurs a risk of the loss of cells through overflow. Since the loss ratio of cells is directly dependent on the size of the stacks of registers, the latter are dimensioned so as to guarantee excellent loss values, of the order of $10^{-10}$ for example. However, regardless of this size, it is always possible for the register stacks to overflow, causing the loss of the relevant cells. Supervision of this phenomenon can consist in counting the number of cells actually lost, and in then deducing the loss ratio from this by comparing with the number of cells actually transmitted. However, the smallness of the ratios to be measured means that the confidence interval of the statistical estimate is too large for it to be easily coped with.

Another method consists in likening each of the traffic flows of cells which have passed into the switch to a more or less simple statistical model for which it is possible to calculate the multiplexing characteristics in an ATM queue.

The method introduced is novel in that it uses the actual traffic directly to estimate the occupancy of the stacks of output registers. The assumption which is made regarding the profile of the sources is minimal since it amounts simply to assuming that the traffic which has flowed can be estimated, the sources being regarded as stationary and ergodic.

The basis of the method resides in the existence of a scaling relation in the formula giving the loss ratio for a register of finite size B whose flow capacity is c cells per second and which is subjected to the traffic generated by N identical connections. This relation which is known in particular from the article in the IEEE Transactions on Communications Vol. 43 no. 2/3/4C. Courcoubetis et al entitled "Admission Control and Routing ATM networks using Inferences from Measured Buffer Occupancy" is as follows:

$$f((1+\varepsilon)N, B, c) = F\left(N, B\frac{c}{(1+\varepsilon)}\right) \tag{1}$$

Estimation of the second term in relation (1) is possible by emulating the register stack corresponding thereto. This amounts to incrementing a counter at the rate of arrival of the cells and in decrementing it at the service rate $c/(1+\varepsilon)$.

The function F is approximated by the relation $$F\left(N, B, \frac{c}{1+\varepsilon}\right) = A \cdot B - \varepsilon \exp\left(-B \cdot I\left(N, \frac{c}{(1+\varepsilon)}\right)\right) \tag{2}$$

in which the coefficients A, $\epsilon$ and $\varepsilon$ are determined by giving B three different values of sizes of registers and by solving the corresponding equation system with three unknowns.

The error ratio estimated by this method is of the same order of magnitude as the actual loss ratio, however these good results are obtained only by virtue of good knowledge of the current state of the link traversed, of the profile of the calling traffic and regarding the quality objective demanded by all connections established and to be established, given that in an ATM network the decision to admit or to reject a connection may have weighty consequences, since any excess traffic is a potential source of degradation of the quality of the service offered to the connections already established.

The purpose of the invention is to alleviate the aforementioned drawbacks via a method of processing which demands no assumption regarding the statistical nature of the traffic.

To this end, the subject of the invention is a device for estimating the loss ratio of data cells in a digital transmission network switch comprising means for routing cells present on incoming highways to outgoing highways through stacks of registers, characterized in that it comprises a traffic summator for summing the number of cells which are present on each incoming highway during each cell instant and are destined for one and the same outgoing highway, a highway emulation group allocated to each outgoing highway and composed of a specified number of counters simultaneously loaded with the total number of cells which are destined for this highway and are presented on the incoming highways of the switch, the respective counts of each counter being limited by thresholds so as to estimate, when the number of cells totalled up in a counter exceeds a threshold, the number of cells which may be lost on the corresponding outgoing highway.

Other characteristics and advantages of the invention will emerge with the aid of the description which follows in conjunction with the appended drawings which represent.

FIG. 1 an organization of stacks of virtual registers for the implementation of the invention.

Figure 2:
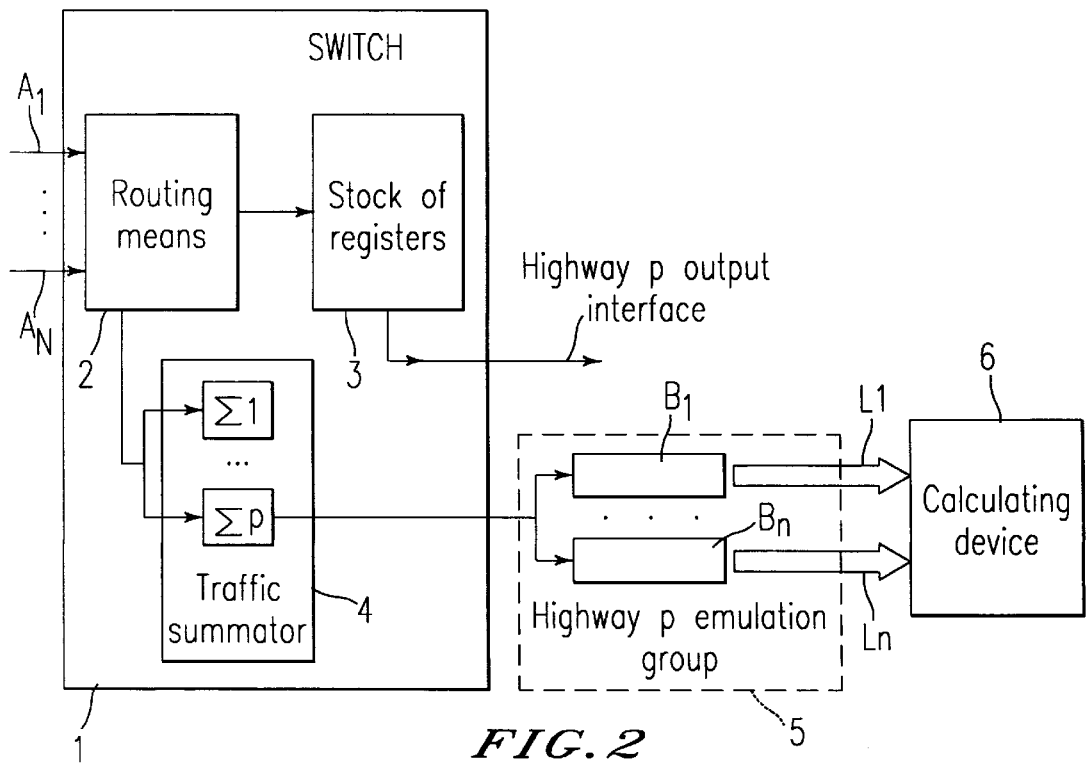

FIG. 2 an embodiment of a complete device allowing estimation of the loss ratio of cells from an ATM switch according to the invention.

The device which is represented in FIG. 1 makes it possible rapidly to evaluate the loss ratio of cells applied to the inputs of a switch and which are destined for one and the same output highway. This device comprises, apart from the register stack B required for queueing the cells destined for the output highway, a set of n counters referenced from $B_1$ to $B_n$, respectively having sizes $T_1$ to $T_n$ and different counting thresholds $S_i (i=y \ldots n)$ such that $S_{i-1} < S_i < S_{i+1}$. According to this arrangement, each time that N cells enter the switch destined for the output highway an identical number N of cells is added to the contents of each counter $B_i$. Each time the number totalled up in a counter $B_i$ exceeds within each cell time interval the threshold $S_i$ allocated to it, the difference $L_i$ is reckoned up in an exterior register (not represented in FIG. 1), and then the contents of the counter $B_i$ are reset to the threshold value $S_i$. The gradation of the various thresholds $S_i$ makes it possible to obtain a relatively accurate estimate of the number of cells lost $L_i$ regardless of the greater or lesser number of cells which are present simultaneously on the input highways of the switch. Since the total number of cells which may be routed over an output highway during the time of transmission of a cell is assumed to be bounded by the total number of highways N of the switch minus one and since the value totalled up in a counter $B_i$ cannot exceed that value of the threshold $S_i$ which is allocated to it, the size $T_i$ of a counter $B_i$ is determined by the relation $$T_i \geq S_i + N - 1$$

The contents of a counter $B_i$ are decremented by a unit with each period of a time base $C_i$ whose tempo is calibrated by the speed of transmission of each virtual register stack associated with each counter $B_i$.

Evaluation of the loss ratio of cells over the switch as a whole takes place in the manner represented in FIG. 2 which represents a switch furnished with means of internal routing 2 of incoming cells on highways $A_1 \ldots A_N$ to an outgoing highway p through a register stack 3. For each highway p of the switch, a traffic summator 4 maintains a variable $\Sigma p$ equal to the number of cells which are destined therefor during each current cycle time of a cell. At the following cycle time, the value $\Sigma p$ is transmitted to a highway emulation group 5 at the same time as a cell is transmitted, destined for the register stack 3. The emulation group 5 comprises N counters $B_i$ of the type which are represented in FIG. 1. These determine each difference $L_i$ as a function of the value $\Sigma p$ and transmit them to a device 6 for calculating the actual loss ratio of cells on the highway p. In this calculation the number of cells lost is obtained from the relations $$L_i \leftarrow \mathrm{Max}(K_i + M - S_i, 0)$$

and $$K_i \leftarrow \mathrm{Min}(S_i, K_{i+M})$$

in which M is the number of cells which have appeared on the input highways and which are destined therefor, $L_i$ is the number of virtually lost cells and $K_i$ is the value of the counter $B_i$. In this way the loss ratio can be estimated in a simple way at each cycle time by forming the ratio between the number of cells regarded as lost by the counters $B_i$ and the cells which have been counted by the traffic summator. The advantage of this solution is that it allows evaluation of the losses which might be experienced by the register B linked to the highway well before the L cells giving rise to overflow of the register B are actually lost.

What is claimed is:

1. A device for estimating a loss ratio of data cells in a digital transmission network switch having a router configured to route cells present on incoming highways to outgoing highways through stacks of registers, comprising:

a traffic summator configured to provide an output indicating a total number of cells which are present on each incoming highway during each cell instant that are destined for a same one of the outgoing; and a plurality of highway emulation groups each highway emulation group being allocated to a corresponding one of the outgoing highways and having a specified number of counters that are each connected to simultaneously receive the output from the traffic summator, said specified number of counters of each of said highway emulation groups having a different threshold value and being configured to count the number of cells being output from the summator to each counter until said count exceeds the different threshold value of each counter so that an estimate of the number of cells lost on the corresponding one of the outgoing highways can be obtained based upon a difference determined between the exceeded different threshold value of each counter and the output from the traffic summator.

2. The device according to claim 1, wherein said estimate is made by a calculation device before there is actual overflow of data cells relative to the stacks of registers and a corresponding actual loss of such overflow data cells.

3. A device for estimating a loss ratio of data cells in a digital transmission network switch including a first means for routing cells present on incoming highways to outgoing highways through stacks of registers, comprising:

a second means for providing a summation output value indicative of a totaling of all of the data cells which are present on each incoming highway during each data cell instant that are destined for a same one of the outgoing highways after passing through the stack of registers; and a plurality of highway emulation means, each one of the plurality of highway emulation means being associated with a corresponding one of the outgoing highways and having a specified number of third means for counting, each of said specified number of third means of each highway emulation means having a different threshold counting value and being connected to simultaneously receive the summation output value from the second means indicative of all of the data cells which are present on each incoming highway during each data cell instant that are destined for the corresponding one of the outgoing highways and functioning to count the summation output value until said count exceeds the different threshold value of each of said specified number of third means so that an estimate of the number of data cells lost relative to the corresponding one of the outgoing highways can be obtained based upon a determined difference between the exceeded different threshold value of each of said specified number of third means and the summation output value.

4. The device according to claim 3, wherein said estimate is made by a calculation means before there is actual overflow of data cells relative to the stacks of registers and a corresponding actual loss of such overflow data cells.

* * * * *